United States Patent [19]

Corry

[11] 3,859,584

[45] Jan. 7, 1975

[54] APPARATUS FOR GENERATING THREE PHASE SINUSOIDAL VOLTAGES

[75] Inventor: Thomas M. Corry, Goleta, Calif.

[73] Assignee: General Motors Corporation, Detroit, Mich.

[22] Filed: Mar. 13, 1974

[21] Appl. No.: 450,818

[52] U.S. Cl. .................... 321/5, 321/DIG. 1

[51] Int. Cl. .................... H02m 7/52

[58] Field of Search .................... 321/5.9 R, DIG. 1; 323/43.5 S; 318/227

[56] References Cited

UNITED STATES PATENTS 3,725,767 4/1973 Corry .................... 321/DIG. 1

*Primary Examiner*—William H. Beha, Jr.

*Attorney, Agent, or Firm*—Howard N. Conkey

[57] ABSTRACT

An apparatus for inverting input unidirectional source voltage to generate substantially sine-wave, three-phase, line-to-line output voltages. A center voltage inverter generates flat top power center portions of line to neutral generated voltages. An ascending and descending voltage generator includes a square wave or flat top inverter operating at the equivalent of three times the fundamental frequency which feeds a multiple tap inductor. A number of switches are coupled to respective taps and are selectively gated conductive to generate some of the requisite ascending or descending stepped line to neutral voltage values. The remaining one of the stepped line-to-neutral voltages from each pair is generated by a transformer having its primary winding coupled across the high voltage tap of the multiple tap inductor and the output of the bank of switches.

3 Claims, 6 Drawing Figures

APPARATUS FOR GENERATING THREE PHASE SINUSOIDAL VOLTAGES

This invention relates to inverters and, more specifically, to an improved power center inverter for generating sinusoidal line-to-line voltages from switched line-to-neutral voltages.

A method of an apparatus for generating a three-phase sinusoidal voltage is described in detail in U.S. Pat. No. 3,725,767 which is assigned to the assignee of this invention. In this patent, three-phase, line-to-line, sinusoidal voltages are generated from stepped line-to-neutral voltages having steps so chosen that they combine, in the line-to-line voltages, to produce a very close approximation of a true sine wave having a high fundamental content and low harmonic distortion. Most of the power transfer from a unidirectional source to the load conductors is effected through flat-top power center portions of line-to-neutral generated voltages. A portion of the power to the load is supplied by an ascending and descending voltage generator which produces alternate pairs of stepped ascending and descending line-to-neutral voltages at a frequency equal to three times the fundamental frequency of the sinusoidal output which are selectively switched to complement the power center voltage of each phase voltage to complete the three-phase, line-to-neutral wave forms. The ascending and descending voltage generator described in the aforementioned patent is comprised of a left bank of controlled switches and a right bank of controlled switches, each of which are selectively gated conductive to generate the requisite pair of stepped wave forms to complement the power center voltage. Each of these banks of switches requires a significant number of controlled switches to effect the generation of those stepped wave forms. This invention improves on the system described in the aforementioned patent by decreasing the number of controlled switches required to generate the stepped ascending and descending voltages. It is, therefore, the general object of this invention to provide an inverter of the aforementioned type wherein the number of controlled switches in the ascending and descending voltage generator are significantly reduced.

It is a further object of this invention to provide an improved apparatus for generating three-phase, line-to-line, sinusoidal voltages from a substantially constant unidirectional source by combining line-to-line flat top power center portions with alternate pairs of stepped ascending and descending line-to-neutral voltages, wherein the alternate pairs of stepped ascending and descending line-to-neutral portions are generated by a flat-top inverter operating at three times the fundamental frequency and feeding a multiple voltage tap inductor, a bank of controlled switches coupled to the taps and selectively gated conductive to generate one of each pair of the requisite ascending or descending stepped voltage values and a transformer coupled between the high voltage tap of the multiple tap inductor and the output of the bank of controlled switches to generate the other one of each of the pairs stepped line-to-neutral voltages.

The objects of this invention may be best understood by reference to the following description of the preferred embodiment and the drawings in which.

The concept and detailed description of the type of three-phase, sinusoidal voltage generator to which this invention is directed appears in U.S. Pat. No. 3,725,767 assigned to the assignee of this invention, the contents of which is hereby incorporated by reference.

Figure 1:
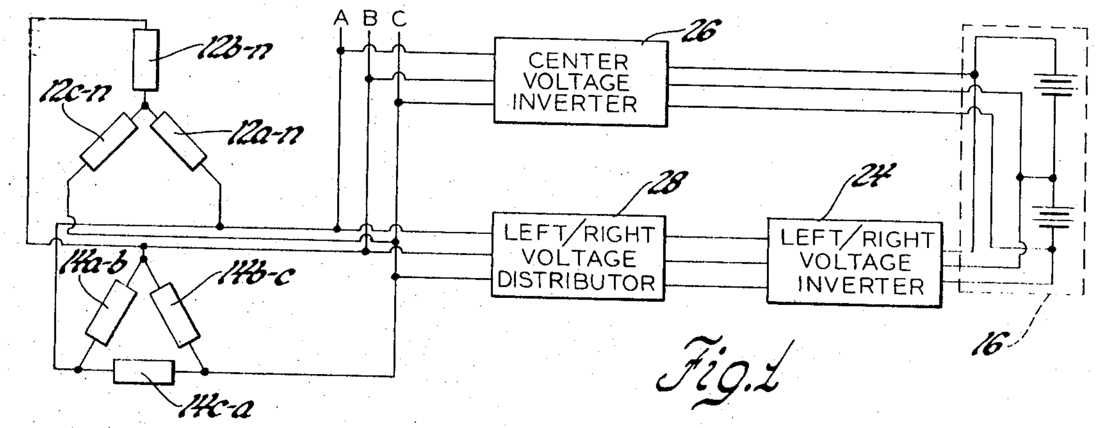
FIG. 1 is a circuit diagram, partially in blocked form, showing a three-phase power system of the type to which the present invention is applicable.

FIG. 1 shows in diagrammatic and block form the three-phase power system within which the present invention is incorporated. The unidirectional power source, indicated at 16, is a source of substantially constant potential having a center tap as shown. The source may, for example, be a battery, a rotating d-c generator, or rectified a-c voltage. A center voltage inverter indicated at 26 is connected to the source 16, and as described in more detail hereafter, this inverter applies line-to-neutral flat-top voltages directly from the source 16 to three output lines A, B and C in three-phase substantially 60° duration voltage pulses. These voltage pulses are shown as UC (upper center) and LC (lower center) in the respective line-to-neutral voltages shown in FIG. 2. These voltage pulses are referred to hereafter as the upper center and lower center voltage pulses and, alternatively, as the line-to-neutral waveform power center.

The three line conductors A, B, and C receive left/right voltages from the source 16 through a left/right or ascending and descending voltage generator or inverter 24, to which this invention is directed and a left/right voltage distributor 28. The inverter 24 produces the increasing and decreasing voltages waves LL (lower left), UL (upper left), LR (lower right), and UR (upper right) of the three line-to-neutral voltages, and the voltage distributor 28 switches the respective voltages to the appropriate line conductors to construct the respective line-to-neutral voltage shown in FIG. 2.

Figure 2:
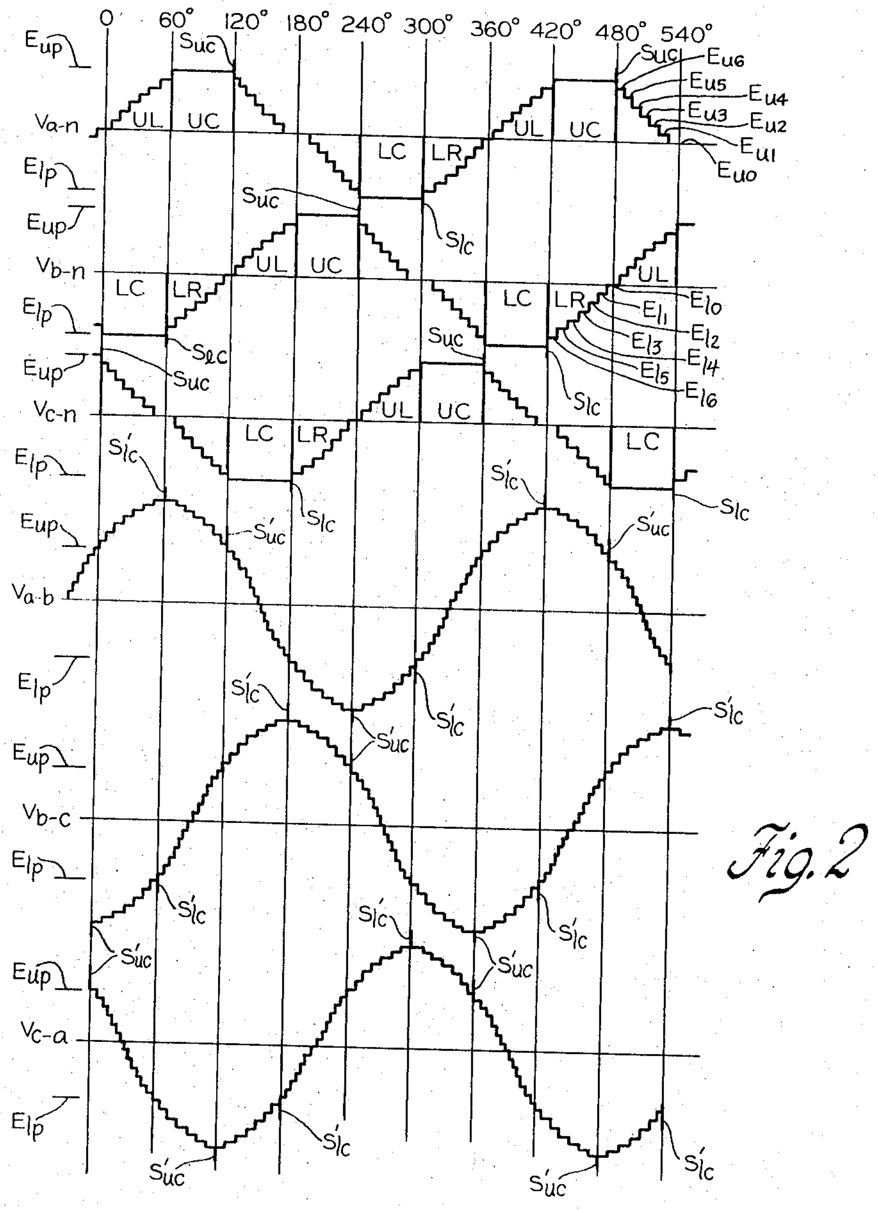
FIG. 2 is a diagram showing, in general form, three line-to-neutral, and three line-to-neutral voltages generated in accordance with the present invention.

Respective pairs of the line-to-neutral voltages $V_{a-n}$, $V_{b-n}$ and $V_{c-n}$ in FIG. 2 are combined to produce the line-to-line voltages $V_{a-b}$, $V_{b-c}$ and $V_{c-a}$. In the drawing of FIG. 1, a Y-connected load comprising the load elements $12_{a-n}$, $12_{b-n}$ and $12_{c-n}$ and a delta connected load comprising load elements $14_{a-b}$, $14_{b-c}$, and $14_{c-a}$ are shown connected for A.C. excitation by the conductors A, B and C.

In the flat-top, line-to-neutral voltage waveforms $V_{a-n}$, $V_{b-n}$ and $V_{c-n}$ shown in FIG. 2, each cycle of each of the three line-to-neutral voltage waveforms includes an upper center waveform portion UC, an upper right waveform portion UR, a lower left waveform portion LL, a lower center waveform portion LC, and a lower right waveform portion LR. The six waveform portions UC, UL, LL, LC, LR, and UR are of approximately equal duration, each extending over approximately 60 electrical degrees in each cycle of the respective line-to-neutral waveforms.

As shown in the graphs, the upper center waveform portion UC is defined by an upper center voltage segment $V_{uc}$ which is substantially constant at an upper potential $E_{up}$ above the neutral potential $E_{np}$. Similarly, the lower center waveform portion LC is defined by a lower center voltage segment $V_{lc}$ which is substantially constant at a lower potential $E_{lp}$ below the neutral potential $E_{np}$. The upper left waveform portion UL is defined by an upper left voltage segment $V_{ul}$ which ascends in a series of voltage steps from the neutral potential $E_{np}$ to the upper potential $E_{up}$. The upper right waveform portion UR is defined by an upper right voltage segment $V_{ur}$ which descends in a series of voltage steps from the upper potential $E_{up}$ to the neutral potential $E_{np}$. The lower left waveform portion LL is defined by a lower left voltage segment $V_{ll}$ which descends in a series of voltage steps from the neutral potential $E_{np}$ to the lower potential $E_{lp}$. The lower right waveform portion LR is defined by a lower right voltage segment $V_{lr}$ which ascends in a series of voltage steps from the lower potential $E_{lp}$ to the neutral potential $E_{np}$.

Due to the symmetry of the line-to-neutral voltage waveforms $V_{a-n}$, $V_{b-n}$ and $V_{c-n}$, the upper center, left and right waveform portions UC, UL, and UR, and the lower center, left and right waveform portions LC, LL, and LR are of equal magnitude, respectively, relative to the inverter neutral potential $E_{np}$. Further, as shown, the respective line-to-neutral waveforms have half-cycle symmetry.

Although the line-to-neutral voltage waveforms $V_{a-n}$, $V_{b-n}$ and $V_{c-n}$ do not depart substantially from a sine wave, for the purposes of the present invention, this departure is deliberately made greater than the minimum possible departure when viewed from the standpoint of the line-to-neutral voltage. In this connection, it should be noted that the voltages "seen" by the inverters 24 and 26 and by the distributor 28 are line-to-neutral voltages in relation to the center tapped source 16. The voltages seen by line-to-line connected loads such as $14_{a-b}$, $14_{a-c}$ and $14_{b-c}$ are the line-to-line voltages. With a 60° flat-top, line-to-neutral wave, it is possible to generate pure sine-wave, line-to-line voltages. As a practical matter, it is possible to use a flat-top, line-to-neutral wave exceeding 60° in conjunction with stepped rising and falling portions (such that the line-to-neutral voltage has high harmonic content) and still obtain line-to-line voltages with harmonic content largely confined to high order harmonics.

Figure 3:
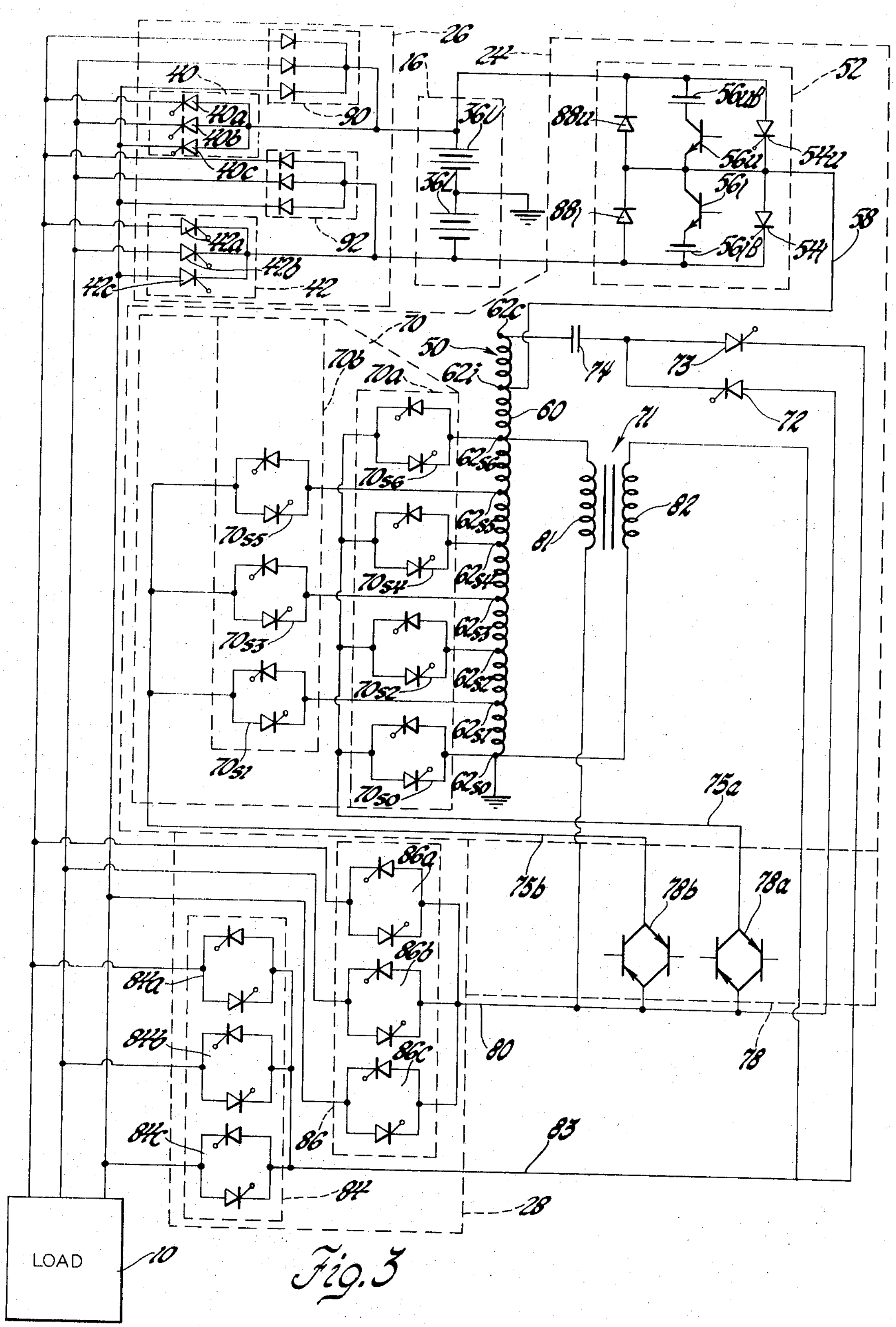
FIG. 3 is a circuit diagram of a specific apparatus for generating voltage in accordance with the present invention.

FIG. 3 shows, in circuit diagram form, a three-phase inverter constructed in accordance with the present invention with portions corresponding to parts identified in FIG. 1 having like reference numerals.

The center voltage generator 26 alternately provides positive and negative power center voltage portions at three times the preselected operating frequency of the lint-to-line voltage waveforms $V_{a-b}$, $V_{b-c}$ and $V_{c-a}$. These are distributed in sequence as the portions UC and LC to the respective phases as illustrated in FIG. 2 and described above. The left/right or ascending and descending voltage generator 24 alternately produces the simultaneous upper left and right voltage segments $V_{ul}$ and $V_{ur}$ and the simultaneous lower left and right voltage segments $V_{ll}$ and $V_{lr}$ at three times the frequency of the line-to-line voltage waveforms $V_{a-b}$, $V_{b-c}$ and $V_{c-a}$. The left/right voltage distributor 28 applies the upper left and right voltage portions UL and UR and the lower left and right voltage portions LL and LR of FIG. 2 to the phase lines A, B and C to define the corresponding upper and lower left and right waveform portions UL, UR, LL and LR of each line-to-neutral voltage.

Figure 5:
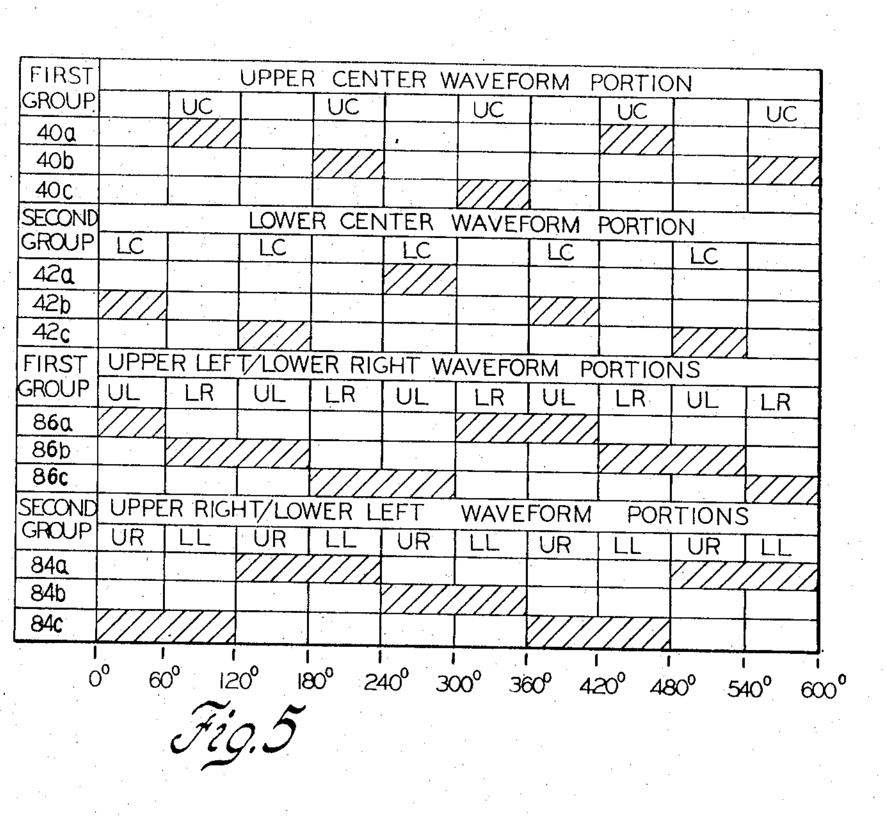

The generator or inverter 26 provides positive and negative output voltage pulses at a repetition rate three times the frequency of the output line-to-line wave. These pulses are selectively and alternately distributed to the three line conductors A, B and C to develop the power center portions of the line-to-neutral voltages of FIG. 2. The controlled rectifiers **40*a*, 40*b*, and 40*c* make up a bank 40 connecting the positive terminal of the unidirectional source 16 to the respective three-phase lines A, B and C. It will be observed that when the rectifiers 40*a*, 40*b* and 40*c* are selectively made conductive, the full voltage of source 36U in relation to the neutral or ground connection is applied to the selected line A, B or C. The controlled rectifiers 42*a*, 42*b*, and 42*c* similarly make up a bank 42 connecting the negative terminal of the unidirectional voltage source 16 respectively to the three-phase lines A, B and C, so that as these rectifiers are selectively gated conductive, the selected line is made negative in relation to the neutral or ground in the amount of the voltage of source 36L. The voltage sources 36U and 36L have equal output levels so that by making the respective rectifiers in banks 40 and 42 conductive, the requisite power center voltages UC and LC of FIG. 2 are applied to the line conductors. The timing diagram of FIG. 5 shows the periods during which the respective controlled rectifiers are made conductive to provide a 60° power center. The rectifiers 40*a*, 40*b*, 40*c*, 42*a*, 42*b*, and 42*c*** of the drawing are preferably silicon controlled rectifiers, each controlled rectifier being made conductive by application of a gate control voltage at the instant conduction is desired and being made nonconductive by reverse bias from a commutating pulse at the instant turnoff is desired.

The ascending and descending voltages are derived from sources 36U and 36L via the flat-top full-wave single-phase inverter 52. The inverter 52 includes first and second drive voltage inverter switches $54_u$ and $54_l$ and first and second drive voltage commutator switches $56_u$ and $56_l$. The first and second drive voltage inverter switches $54_u$ and $54_l$ are unicontrol unilateral electronic switches, such as silicon controlled rectifiers. The first and second drive voltage commutator switches $56_u$ and $56_l$ are provided by bicontrol unilateral electronic switches, such as transistors. The auxiliary sources $56_{uB}$ and $56_{lB}$ serially connected with the respective commutating switches provide the requisite reverse bias potential for commutation of the inverter switches $54_u$ and $54_l$.

The first and second drive voltage inverter switches $54_u$ and $54_l$ are each connected between a different corresponding one of the drive voltage inverter switches $54_u$ and $54_l$. The first and second drive voltage inverter switches $54_u$ and $54_l$ and the first and second drive voltage commutator switches $56_u$ and $56_l$ combine to produce square-wave drive voltage pulses on the inverter output line 58. The drive voltage alternates between the upper potential $E_{up}$ and the lower potential $E_{lp}$, of FIG. 2, three times for each cycle of the line-to-line voltage waveforms $V_{a-b}$, $V_{b-c}$ and $V_{c-a}$. Hence, the drive voltage is a square wave which alternately resides at the upper potential $E_{up}$ and at the lower potential $E_{lp}$ during successive 60 electrical degree intervals of the line-to-line or line-to-neutral voltages. The drive voltage commutator switches $56_u$ and $56_l$ commutate or turn off the corresponding ones of the drive voltage inverter switches $54_u$ and $54_l$ by connecting the auxiliary source voltage of sources $56_{uB}$ and $56_{lB}$, respectively, to reverse bias the inverter switches $54_u$ and $54_l$. This reverse bias is timed to occur when the inverter 52 is supplying minimum current.

A voltage reference device or autotransformer 50 comprises a single winding 60 having a multiplicity of voltage taps 62 including an input tap $62_i$, a group of steps taps $62_s$, and a commutator tap $62_c$. The group of step taps $62_s$ is composed of a plurality (seven in the example of the drawing) of voltage taps $62_{sO}$–$62_{s6}$. The input tap $62_i$ is connected with the inverter output line 58. The stap tap $62_{sO}$ is connected to the neutral point in common with the center tap of the source 16. Thus, in operation, the autotransformer 50 is subject to alternate positive and negative voltages from sources 36U and 36L applied through conductor 58 to tap $62_i$. This alternating voltage causes the flux linking the winding 60 to alternate substantially at the rate of the applied voltage between tap $62_i$ and ground. As a consequence, the taps $62_{sO}$, $62_{sl}$, $62_{s2}$, $62_{s3}$, $62_{s4}$, $62_{s5}$ and $62_{s6}$ substantially divide the total applied voltage in accordance with their proportionate turns. Thus, these respective taps each have substantially square-wave voltages with respect to ground that are in synchronism with the voltage at tap $62_i$. Each tap voltage is a percentage of the voltage at tap $62_i$, determined by the turns associated with the respective tap and the total turns to tap $62_i$. The step taps $62_{sO}$–$62_{s6}$ are spaced on the winding 60 so that each is at one of the upper set of step levels $E_{u0}$–$E_{u6}$, UR or UL of FIG. 2, when the drive voltage at the input tap $62_i$ is at the upper potential $E_{up}$ and at one of the lower set of step levels $E_{l0}$–$E_{l6}$, LR or LL of FIG. 2, when the drive voltage at the input tap $62_i$ is at the lower potential $E_{lp}$. It is noted that all the line-to-neutral waveforms of FIG. 2 include identical sets of upper and lower left and right steps and, accordingly, only one upper and one lower set of steps are labeled. Further, the commutator tap $62_c$ defines the upper commutator level $E_{uc}$ when the drive voltage at the input tap $62_i$ is at the upper potential $E_{up}$ and defines the lower commutator level $E_{lc}$ when the drive voltage at the input tap $62_i$ is at the lower potential $E_{lp}$.

The left/right voltage inverter 24 includes a bank of voltage level selector switches 70 and a step coupling transformer 71. The bank of voltage level selector switches 70 includes a set of sub-banks $70_a$ and $70_b$. The sub-bank $70_a$ includes a number of step level selector switches $70_{s0}$, $70_{s2}$, $70_{s4}$ and $70_{s6}$ and the sub-bank $70_b$ includes a plurality of step level selector switches $70_{sl}$, $70_{s3}$ and $70_{s5}$. Each of the step level selector switches $70_{s0}$ through $70_{s6}$ is provided by a unicontrol bi-lateral electronic switch illustrated in FIG. 3 as a pair of oppositely poled controlled rectifiers.

The left/right voltage inverter 24 further includes a pair of commutator level selector switches 72 and 73. The anode of the switch 73 and the cathode of the switch 72 are coupled to the commutator tap $62_c$ through a commutating capacitor 74.

Each of the step level selector switches $70_{s0}$, $70_{s2}$, $70_{s4}$ and $70_{s6}$ comprising the sub-bank 70a of the selector switches 70 is connected between a voltage level selector line $75_a$ and a different corresponding one of the step taps $62_{s0}$, $62_{s2}$, $62_{s4}$ and $62_{s6}$. Each of the step level selector switches $70_{s1}$, $70_{s3}$ and $70_{s5}$ comprising the second sub-bank $70_b$ of the selector switches 70 is connected between a voltage selector line $74_b$ and a different corresponding one of the step taps $62_{sl}$, $62_{s3}$ and $62_{s5}$.

A voltage level commutator switch 78 includes a pair of commutator switches $78_a$ and $78_b$ each of which is provided by a bi-control bi-lateral electronic switch, illustrated in FIG. 3 as a pair of oppositely poled transistors. The voltage level commutator switch 78 has a voltage level commutator line or voltage output line 80. Each of the voltage level commutator switches $78_a$ and $78_b$ is connected between a different corresponding one of the voltage level selector lines $75_a$ and $75_b$ and the output line 80. Thus, each of the voltage level commutator switches $78_a$ and $78_b$ is connected between a different corresponding one of the sub-banks $70_a$ or $70_b$ and the output line 80.

The step coupling transformer 71 includes a primary winding 81 and a secondary winding 82 having a one-to-one turns ratio, the primary being coupled between the tap $62_{s6}$ on the auto transformer 50, representing the high voltage tap with respect to the voltage level selector switches 70, and the voltage level commutator line 80. The secondary winding 82 is coupled between ground potential at the stepped tap $62_{s0}$ and a voltage level commutator line or voltage output line 83.

The anode of the commutator level selector switch 72 is coupled to the voltage level commutator line 80, and the cathode of the commutator level selector switch 73 is coupled to the output line 83.

The voltage level commutator switch 78 combines with the bank of step level selector switches 70 to produce one of the upper left or right voltage portions UL or UR of FIG. 2 or one of the lower left or right voltage portions LL or LR of FIG. 2 depending on the excitation polarity at tap $62_i$. The stepped coupling transformer 71 functions to produce the other of the upper left or right voltage portions UL or UR or the other of the lower left or right voltage portions LL or LR as will be described. Further, the commutator level selector switches 72 and 73 function to produce a different one of the upper and lower commutator voltage pulses $S_{uc}$ and $S_{lc}$ of FIG. 2.

The upper left and right stepped voltage portions UL and UR are formed during the 60 electrically degree intervals when the drive voltage applied to the input tap $62_i$ is at the upper potential $E_{up}$ so that the upper set of step levels $E_{u0}$ through $E_{u6}$ are available at the stepped taps $62_{s0}$ through $62_{s6}$ respectively. Assuming the step level selector switches 70 produce the upper left voltage portion UL, during these 60° intervals, the bank of step level selector switches 70 combines with the commutator switch 78 to connect successive ones of the transformer taps $62_{s0}$ through $62_{s6}$ in ascending order to the output line 80 to define the individual voltage steps $E_{u0}$ through $E_{u6}$ in the upper left voltage segment UL. As the bank of step level selector switches 70 and the commutator switches 78 function to generate the upper left step voltage segment UL, the voltage across the primary winding of the step coupling transformer 71 is equal to the voltage at the tap $62_{s6}$ minus the voltage at the output line 80. Therefore, as the bank of step level selector switches 70 and the commutator switches 78 connect successive ones of the transformer taps $62_{s0}$–$62_{s6}$ in ascending order to the output line 80, the voltage across the primary winding and consequently the voltage induced across the secondary winding 82 has a magnitude decreasing from the magnitude of the voltage at the tap $62_{s6}$ in step wise fashion as the taps $62_{s0}$ through $62_{s6}$ are sequentially coupled to the output line 80. In this matter, the secondary winding 82 supplies the upper right voltage portion UR to the output line 83 having the individual voltage steps varying from $E_{u6}$ to $E_{u0}$.

In a similar manner, the lower left and right voltage portions LL and LR are formed during the 60 electrical degree intervals when the drive voltage applied to the input taps $62_i$ is at the lower potential $E_{lp}$ so that the lower set of stepped levels $E_{l0}$ through $E_{l6}$ are available at the stepped taps $62_{s0}$ through $62_{s6}$ respectively.

Assuming the step level selector switches 70 produce the lower right voltage portions LR, during these 60° intervals, the bank of step level selector switches 70 combines with the commutator switch 78 to connect successive ones of the transformer taps in descending order to the output line 80 to define the individual voltage steps $E_{l6}$ through $E_{l0}$ in the lower right voltage portion LR. The output across the secondary winding 82 of the step coupling transformer 71 is equal to the voltage at the tap $62_{s6}$ minus the voltage at the tap $60_{s0}$ through $60_{s6}$ coupled to the output line 80 through the step level selector switches 70 and the commutator switches 78. Consequently, the voltage coupled to the output line 83 from the secondary winding 82 comprises the lower left voltage portion LL having the individual voltage levels $E_{l0}$ through $E_{l6}$.

As can be seen from the foregoing, the use of the step coupling transformer 71 greatly reduces the number of controlled switches required to produce the upper right and left and lower right and left voltage portions to thereby accomplish the primary object of this invention. Further, as the transformer 71 operates at three times the fundamental frequency, the transformer 71 may be minimal in size and weight.

When the excitation voltage applied to the tap $62_i$ is at the upper potential $E_{up}$, the upper commutator voltage $E_{uc}$ is available at the commutator tap $62_c$. As the drive voltage shifts to the upper potential $E_{up}$, the commutator level selector switch 73 provides the upper commutator voltage $S_{uc}$ of FIG. 2. Similarly, when the drive voltage applied to the input tap $62_i$ is at the lower potential $E_{lp}$, the lower commutator voltage $E_{lc}$ is available at the commutator tap $62_c$. As the drive voltage shifts to the lower potential $E_{lp}$, the second commutator level selector switch 72 provides the lower commutator voltage pulse $S_c$ of FIG. 2.

In operation, the step waves available as described are combined with a power center voltage portion from the inverter 26 to provide the three line to neutral voltages of FIG. 2 at any instant of time. When one of the voltage level selector switches $70_{s0}$, $70_{s2}$, $70_{s4}$ and $70_{s6}$ in the sub-bank $70_a$ is gated, the voltage level commutator switch $78_a$ is also gated. In the gated condition, the voltage level commutator switch $78_a$ is conductive to permit conduction from the voltage level selector switches in the sub-bank $70_a$. Similarly, when one of the voltage level selector switches $70_{s1}$,$70_{s3}$ and $70_{s5}$ in the sub-bank $70_b$ is gated, the voltage level commutator switch $78_b$ is also gated. In the gated condition, the voltage level commutator switch $78_b$ is conductive to permit the conduction from the voltage level selector switches in the sub-bank $70_b$. Further, when the voltage level commutator switch $78_b$ is gated, the voltage level commutator switches $78_a$ is ungated. In the ungated condition, the voltage level commutator switch $78_a$ turns off to interrupt current from and turn off the previously gated one of the voltage level selector switches in the sub-bank $70_a$. Likewise, when the voltage level commutator switch $78_a$ is gated the voltage level commutator switch $78_b$ is ungated. In the ungated condition, the voltage level commutator switch $78_b$ turns off to interrupt current from and turn off the previously gated one of the voltage level selector switches in the sub-bank $70_b$.

The left/right voltage distributor 28 comprises first and second groups of left/right phase selector switches 84 and 86. The first group of left/right phase selector switches 84 includes selector switches $84_a$, $84_b$ and $84_c$, and the second group of left/right phase selector switches 86 includes selector switches $86_a$, $86_b$ and $86_c$. Each of the phase selector switches $84_a$, $84_b$, $84_c$ and $86_a$, $86_b$ and $86_c$ is provided by a unicontrol bi-lateral electronic switch illustrated in the drawing by two oppositely poled controlled rectifiers. Each of the left/right phase selector switches $84_a$, $84_b$ and $84_c$ in the first group 84 is connected between a different corresponding one of the phase lines A, B and C and the voltage output line 83. Each of the left/right phase selector switches $86_a$, $86_b$ and $86_c$ in the second group 86 is connected between a different corresponding one of the phase lines A, B and C and the voltage output line 80.

Each of the first and second groups of left/right phase selector switches 84 and 86 applies a respective one of the upper left and right voltage portions UL and UR and a respective one of the lower left and right voltage portions LL and LR to the phase lines A, B and C to define the corresponding upper and lower left and right waveform portions in each cycle of each of the line-to-neutral voltage waveforms $V_{a-n}$, $V_{b-n}$, and $V_{c-n}$ shown in FIG. 2. More particularly, the left/right phase selector switches in the first group 84 transmit the one of the upper left and right voltage portions UL and UR and the one of the lower left and right voltage portions LL and LR appearing on the voltage output line 83. Similarly, the left/right phase selector switches in the second group 86 transmit the one of the upper left and right voltage portions UL and UR and the one of the lower left and right voltage portions LL and LR appearing on the voltage output line 80.

In addition, each of the first and second groups of left/right phase selector switches 84 and 86 applies a respective one of the upper and lower commutator voltage pulses $S_{uc}$ and $S_{lc}$ to the phase lines A, B and C to commutate a different one of the first and second banks of center voltage phase selector switches 40 and 42 through forced or reverse bias commutation.

Correspondingly, each of the first and second banks of center phase selector switches 40 and 42 applies a different one of the upper and lower center voltage segments UC and LC to the phase lines A, B and C to commutate the first and second groups of left/right phase selector switches 84 and 86 through forced or reverse bias commutation.

A pair of bypass diodes $88_u$ and $88_l$ are each connected across a different corresponding one of the drive voltage inverter switches $54_u$ and $54_l$, as shown in the drawing, so that a reactive current path exists through the left/right voltage distributor 28 and through the left/right voltage generator 24 at any instant in time. Accordingly, the power supply 16 can operate into a load 10 having a power factor down to the cosine of the angle at which the power center begins. First and second groups of bypass diodes 90 and 92 are each connected across a different corresponding one of the first and second banks of center phase selector switches 40 and 42, as shown in the drawing, so that a reactive current path exists through the center voltage distributor 26 and the center voltage generator 22 at any instant in time. Accordingly, the power supply 16 can operate into a load 10 which exhibits down to approximately 0.0 leading or lagging power factor.

Figure 4:
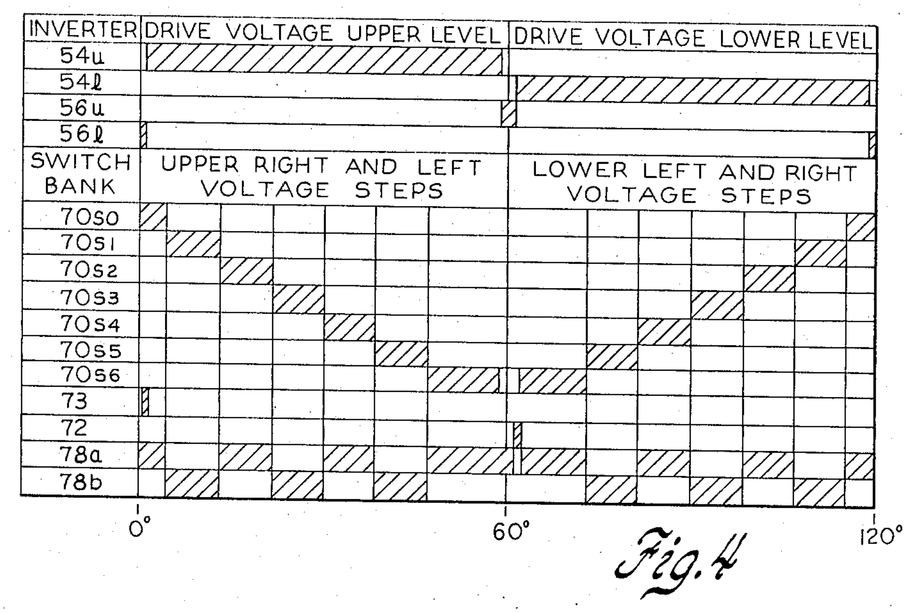
FIGS. 4 and 5 are timing diagrams for the apparatus of FIG. 3, applicable respectively to the ascending and descending voltage generator and the flat top or square wave inverter when producing a 60° power center.

FIG. 4 presents a timing diagram which defines the operation of the various electronic switches in the left/right voltage generator 24 over one-third of a cycle or a 120 electrical degree interval. The timing sequence illustrated in FIG. 4 is repeated 3 times to form a full cycle of 360 electrical degrees. FIG. 5 presents a timing diagram which defines the operation of the various electronic switches in the center voltage distributor 26 and the left/right voltage distributor 28 over a full cycle of 360 electrical degrees. The crosshatched areas in FIGS. 4 and 5 represent the time periods during which the respective electronic switches are gated conductive. The control and timing sequence of FIGS. 4 and 5 produce a waveform having seven voltage steps and a 60° power center similar to that shown in FIG. 2.

The requisite overall timing control may be achieved by providing a suitable source of pulses, serving as clock pulses. These are preferably fed to a digital counter, which counts a selected number of clock pulses, resets to zero, and then repeats the count. Each full count represents the full 360° period.

Figure 6:
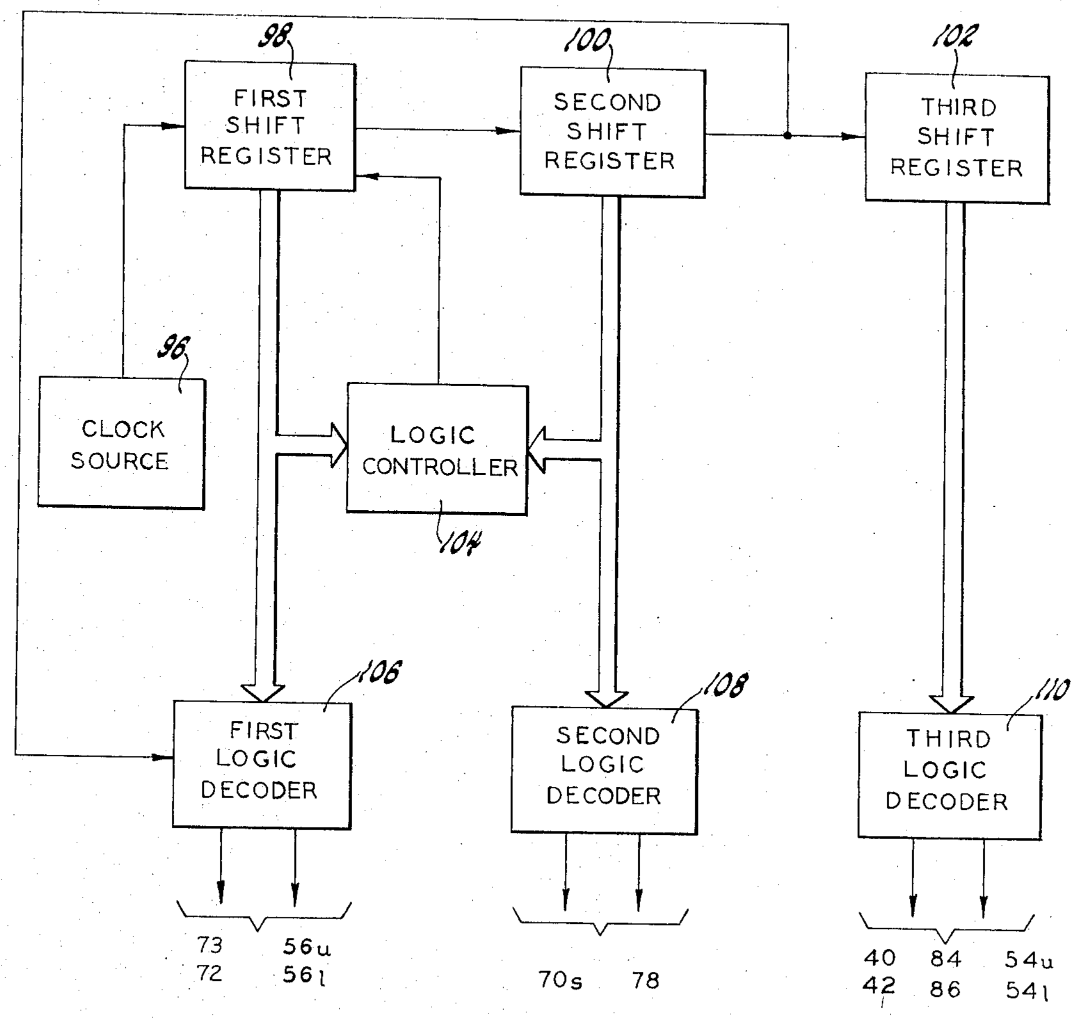
FIG. 6 is a block diagram of a timing control apparatus for the present invention.

FIG. 6 shows a timing block diagram suitable for controlling the power supply in accordance with the timing diagrams shown in FIGS. 4 and 5. A clock source 96 produces standard timing pulses at a fixed frequency which is a high multiple of the given frequency of the line-to-neutral voltage waveforms $V_{a-n}$, $V_{b-n}$, and $V_{c-n}$ and the line-to-line voltage waveforms $V_{a-b}$, $V_{b-c}$ and $V_{c-a}$. Conveniently, the clock source 96 may take the form of an LC oscillator or a crystal oscillator.

A first shift register 98 is indexed in response to the clock pulses. The first shift register 98 produces a voltage step timing pulse when reset. The voltage step timing pulses define the durations of voltage steps in the upper and lower left and right portions UL, UR, LL and LR in the line-to-neutral voltage waveforms $V_{a-n}$, $V_{b-n}$ and $V_{c-n}$. That is, each of the voltage step timing pulses marks the termination of one voltage step and the initiation of another voltage step. A second shift register 100 is indexed in response to the voltage step timing pulses. The second shift register 100 produces a voltage segment timing pulse in response to an appropriate number of voltage step timing pulses. The voltage segment timing pulses define the durations of the upper and lower center, left and right voltage segments UC, LC, UL, UR, LL, and LR in the line-to-neutral voltage waveforms $V_{a-n}$, $V_{b-n}$ and $V_{c-n}$. That is, each of the voltage segment timing pulses marks the termination of one voltage segment and the initiation of another voltage segment. A third shift register 102 is indexed in response to the voltage segment and the initiation of another voltage segment. A third shift register 102 is indexed in response to the voltage segment clock pulses. Preferably, the first and second shift registers are 8-bit registers while the third shift register is a 6-bit register. A logic controller 104 is responsive to the indexing of the first shift register 98 and the indexing of the second shift register 100 to reset the first shift register 98 so as to appropriately time the voltage steps in the upper and lower left and right waveform portions UL, UR, LL and LR of the line-to-neutral voltage waveforms $V_{a-n}$, $V_{b-n}$ and $V_{c-n}$.

A first logic decoder 106 is responsive to the indexing of the first shift register 98 and a voltage segment timing pulse to alternately provide appropriate bias signals for the first and second commutator level selector switches 72 and 73, and for the upper and lower drive voltage commutator switches $56_u$ and $56_l$. A second logic decoder 108 is responsive to the indexing of the second shift register 100 to provide appropriate bias signals for the bank of step level selector switches 70, and for the voltage level commutator switches 78. A third logic decoder 110 is responsive to the indexing of the third shift register 102 to provide appropriate bias signals for the first and second banks of center voltage phase selector switches 40 and 42, for the first and second groups of left/right voltage phase selector switches 84 and 86, and for the upper and lower drive voltage inverter switches $54_u$ and $54_l$. Preferably, the bias signals are coupled from the logic decoders 106, 108, and 110 to the respective switches of the power supply 16 through photo responsive diodes. However, it will be appreciated that any suitable signal coupling devices may be employed.

The description of the preferred embodiment of the invention for the purpose of explaining the principles thereof is not to be considered as limiting or restricting the invention since many modifications may be made by the exercise of skill in the art without departing from the scope of the invention.

What is claimed is:

1. A three phase inverter effective to generate substantially sine wave voltages across a set of three phase line conductors from a unidirectional voltage source having a center tap, the three phase inverter comprising:

a first inverter means connected between the source and the line conductors for producing three-phase, flat-top, full-wave voltages on the respective line conductors in relation to the center tap;

a second inverter means connected to said source and operable to produce a single phase flat top voltage signal at a predetermined frequency;

an inductor having a plurality of taps including a high voltage tap;

means for coupling said inductor between said second inverter means and the center tap of the voltage source, whereby alternating flat top voltage excitation appears thereacross at said predetermined frequency;

a voltage generating means coupled to said inductor, said first voltage generating means having a first output conductor and means to connect the taps of the inductor sequentially to the first output conductor in ascending or descending order to produce corresponding stepped sequentially rising or falling voltages on said first output conductor;

a second output conductor;

means coupled to the high voltage tap and the first output conductor for supplying to the second output conductor a voltage having a magnitude equal to the difference between the magnitude of the voltage at the high voltage tap and the voltage on the first output conductor;

and means for selectively coupling the first and second output conductors to the three phase line conductors in timed relation to the three phase flat top full wave voltages to approximate a balanced and symmetrical voltage on each line conductor.

2. A three-phase inverter effective to generate substantially sine wave voltages across a set of three phase line conductors from a unidirectional voltage source having a center tap, the three-phase inverter comprising:

a first inverter means connected between the source and the line conductors for producing three-phase, flat-top, full-wave voltages on the respective line conductors in relation to the center tap;

a second inverter means connected to said source and operable to produce a single-phase, flat-top voltage signal at a predetermined frequency;

an inductor having a plurality of taps including a high voltage tap;

means for coupling said inductor between said second inverter means and the center tap of the voltage source, whereby alternating flat-top voltage excitation appears thereacross at said predetermined frequency;

a first voltage generating means coupled to said inductor, said first voltage generating means having a first output conductor and means to connect the taps of the inductor sequentially to the first output conductor in ascending or descending order to produce corresponding stepped sequentially rising or falling voltages on said first output conductor;

a second voltage generating means including a second output conductor and a transformer having a primary winding coupled between the high voltage tap and the first output conductor and a secondary winding coupled between the center tap of the voltage source and the second output conductor, the transformer producing stepped voltages on said second output conductor having a magnitude equal to the difference between the magnitude of the voltage at the high voltage tap and the magnitude of the stepped voltages on the first output conductor;

and means for selectively coupling the first and second output conductors to the three phase line conductors in timed relation to the three-phase, flat-top, full-wave voltages to approximate a balanced and symmetrical voltage on each line conductor.

3. A three-phase inverter for providing a substantially sinusoidal output at a preselected frequency $F_1$ comprising:

a unidirectional voltage source having a center tap;

a set of three phase line conductors;

a first inverter connected between said source and said line conductors and effective to produce three-phase, full-wave voltages on the respective line conductors at said frequency $F_1$;

a single-phase, full-wave inverter connected to said source and operating at three times said frequency $F_1$;

an inductor having a plurality of taps including a high voltage tap;

means for coupling said inductor between said last mentioned inverter and the center tap, whereby an alternating excitation voltage appears thereacross having a repetition rate three times said frequency $F_1$;

a first voltage generating means coupled to said inductor, said first voltage generating means having a first output conductor and respective controlled switches for coupling each of the taps of the inductor to the first output conductor;

means for selectively gating each of the controlled switches conductive to connect the taps of the inductor sequentially to the first output conductor in ascending or descending order and in timed relation to the single-phase, flattop voltage signal to produce corresponding stepped sequentially rising or falling voltages on said first output conductor;

a second voltage generating means including a second output conductor and a transformer having a primary winding coupled between the high voltage tap and the first output conductor and a secondary winding coupled between the center tap of the voltage source and the second output conductor, the primary winding and the secondary winding having a 1:1 turns ratio, the transformer producing stepped sequentially rising or falling voltages on said second output conductor having a magnitude equal to the magnitude of the voltage at the high voltage tap minus the magnitude of the stepped voltage on the first output conductor;

and means for selectively coupling the first and second output conductors to the three-phase line conductors in timed relationship to the three-phase, flat-top, full-wave voltages to simulate across respective pairs of line conductor substantially sinusoidal voltages.

* * * * *